(No Model.)

F. W. BACH.
HORSESHOE.

No. 518,772.  Patented Apr. 24, 1894.

WITNESSES:
J. A. Bergstrom
C. Sedgwick

INVENTOR
F. W. Bach
BY
Munn & Co
ATTORNEYS.

UNITED STATES PATENT OFFICE.

FREDERICK W. BACH, OF NEW YORK, N. Y.

HORSESHOE.

SPECIFICATION forming part of Letters Patent No. 518,772, dated April 24, 1894.

Application filed May 26, 1893. Serial No. 475,543. (No model.)

*To all whom it may concern:*

Be it known that I, FREDERICK W. BACH, of the city, county, and State of New York, have invented a new and Improved Horse-shoe, of which the following is a full, clear, and exact description.

My invention relates to improvements in horse shoes; and the object of my invention is to produce a horse shoe having a plurality of calks arranged thereon in such a way as to give the shoe a strong grip on the ground so as to prevent the horse wearing it from slipping in any direction, and also to construct and arrange the calks in such a way that they will not materially add to the cost of the shoe and will enable the horse to get a good footing when either pulling or backing.

Another object of the invention is to so construct the calks that they will not be liable to injure the horse's legs or feet. In my invention the shoe is provided on opposite sides with a series of calks which are arranged diagonally and the outer portions of which are ahead of the inner portions, thus spreading the effective bearing points of the several calks over a comparatively large surface. The calks are not continued to the outer curve of the horse shoe, but terminate a suitable distance before the same.

To this end my invention consists in certain features of construction and combinations of parts, as will be hereinafter described and claimed.

Reference is to be had to the accompanying drawings, forming a part of this specification, in which similar figures of reference indicate corresponding parts in both the views.

Figure 1:
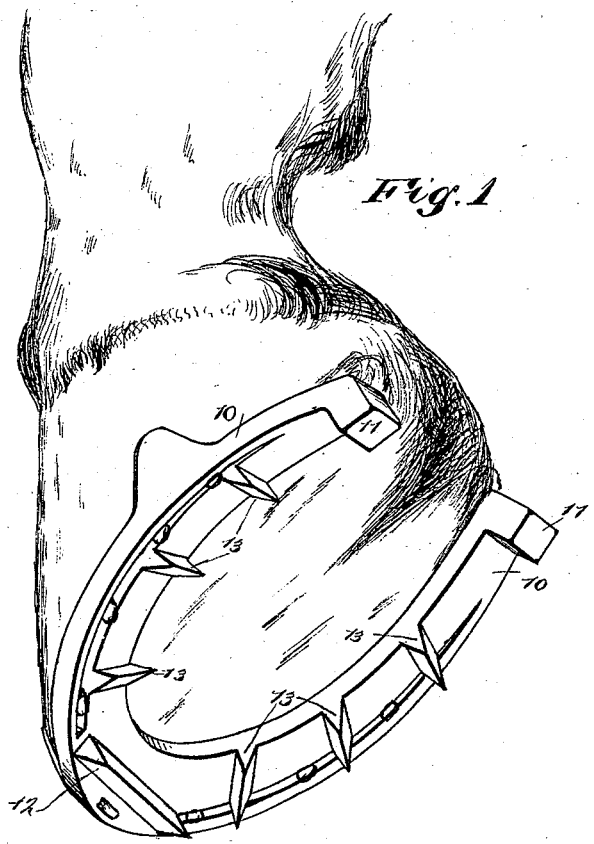
Figure 2:
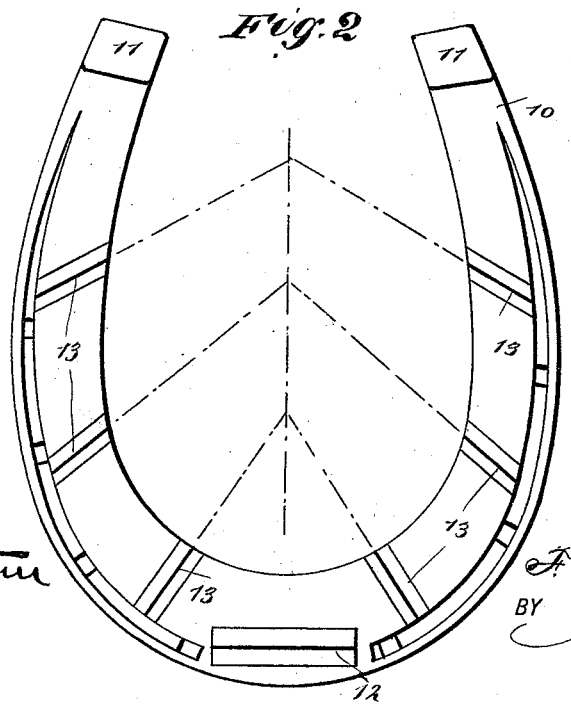

Figure 1 is a perspective view of the shoe as applied to the hoof of a horse, the view showing the under side of the shoe and the arrangement of the calks thereon; and Fig. 2 is an inverted plan view of the shoe.

The shoe 10 is of the customary shape and may be made of any weight or style, and it has the usual heel calks 11 and toe calk 12. The shoe is provided with a series of calks 13 which are arranged diagonally on the sides of the shoe between the heel calks the toe calk, any necessary number being used, although three on a side is usually sufficient, as shown in Fig. 2. The calks 13 are of wedge shape, when viewed in cross section, as will be seen by reference to Fig. 1, and the calks are arranged with their outer ends ahead, as this gives a better bearing surface and enables the horse to get a better grip on the ground. The calks are spaced in order to prevent ice or other foreign matter from sticking between them. It will be noticed by reference to the dotted lines in Fig. 2 that the calks 13 are not placed radially as regards the center of the shoe, but the calks are set at slight angles to each other so that each may bear in a slightly different way on the ground, and slipping is thus effectively prevented. The sharp edges of the calks 12 and 13 extend only to the nail groove and not to the outer edge of the horse shoe, so that the sharp edges of the calks cannot injure the horse when the shoe of the left foot strikes against the right foot or hoof, or vice versa, as often occurs when the horse turns to the right or to the left.

I am aware that it is not new to provide a shoe with calks placed between the toe calk and heel calks, and I do not claim this arrangement broadly as my invention, but what I claim is the peculiar way in which the calks are placed.

Having thus described my invention, I claim as new and desire to secure by Letters Patent—

A horse-shoe provided on its under side with a toe calk and heel calks, and a plurality of wedge-shaped side calks between the heel and the toe, said calks being spaced so as to prevent foreign matter from sticking between them, and placed diagonally at an angle to each other and with their outer ends ahead, the sharp edges of the said side calks and of the toe calk terminating interiorly of the outer edge of the shoe, substantially as described, whereby the horse is protected against injury by the sharp edges of the calks, as set forth.

FREDERICK W. BACH.

Witnesses:
WARREN B. HUTCHINSON,
C. SEDGWICK.